United States Patent [19]

Agari et al.

[11] Patent Number: 4,934,431
[45] Date of Patent: * Jun. 19, 1990

[54] RADIAL TIRES FOR AUTOMOBILES HAVING CARBON FIBER CORD BEAD REINFORCING LAYER

[75] Inventors: Atsunori Agari, Hadano; Ryoji Hanada; Shuuji Takahashi, both of Hiratsuka, all of Japan

[73] Assignee: The Yokohama Rubber Co., Ltd., Tokyo, Japan

[ * ] Notice: The portion of the term of this patent subsequent to Apr. 5, 2005 has been disclaimed.

[21] Appl. No.: 88,485

[22] Filed: Aug. 19, 1987

Related U.S. Application Data

[63] Continuation of Ser. No. 738,330, May 28, 1985, abandoned.

[30] Foreign Application Priority Data

May 31, 1984 [JP] Japan .................... 59-109626

[51] Int. Cl.⁵ .............................. B60C 15/06
[52] U.S. Cl. .................... 152/543; 152/539; 152/547
[58] Field of Search .......... 152/451, 527, 542, 543, 152/539, 547, 555, 556, 565, 458; 57/902; 423/447.1, 447.2

[56] References Cited

U.S. PATENT DOCUMENTS

| 3,774,663 | 12/1973 | Montagne . | |
|---|---|---|---|
| 4,044,540 | 8/1977 | Toki et al. | 57/902 X |
| 4,100,955 | 7/1978 | Pottinger et al. . | |
| 4,185,677 | 1/1980 | Motomura et al. | 152/543 X |
| 4,265,292 | 5/1981 | Inoue . | |
| 4,320,791 | 3/1982 | Fujii et al. | 152/540 |
| 4,342,353 | 8/1982 | Tamura et al. | 152/362 R |
| 4,435,236 | 3/1984 | Inae et al. | 152/563 |
| 4,508,152 | 4/1985 | Sano et al. | 152/543 |
| 4,531,561 | 7/1985 | Ippen et al. . | |
| 4,535,027 | 8/1985 | Kobashi et al. | 264/210.7 |
| 4,573,511 | 3/1986 | Kabe et al. . | |
| 4,735,249 | 4/1988 | Kabe et al. | 152/539 |

FOREIGN PATENT DOCUMENTS

| 3519212 | 5/1985 | Fed. Rep. of Germany . | |
|---|---|---|---|
| 2483854 | 12/1981 | France | 152/354 |
| 56-40043 | 9/1981 | Japan . | |

OTHER PUBLICATIONS

Rubber Technology and Manufacture, C. M. Blow, p. 220.

Primary Examiner—Merrell C. Cashion, Jr.
Assistant Examiner—Geoffrey L. Knable
Attorney, Agent, or Firm—Armstrong, Nikaido, Marmelstein, Kubovcik & Murray

[57] ABSTRACT

A radial tire for an automobile having along each bead a reinforcing layer formed by cords of carbon fibers.

4 Claims, 4 Drawing Sheets

RADIAL TIRES FOR AUTOMOBILES HAVING CARBON FIBER CORD BEAD REINFORCING LAYER

This is a continuation of Ser. No. 738,330, filed 5/28/85, now abandoned.

BACKGROUND OF THE INVENTION

This invention relates to radial tires for automobiles which are excellent from the standpoints of steering stability, riding comfort and durability for use at a high speed.

The development of a freeway network and the improvement in performance of automobiles have given rise to a variety of continuously changing demands for tires of higher performance. For example, there have been a demand for HR tires which are more suitable for use at a high speed than SR tires, or a demand for VR tires which are still more suitable for use at a high speed, and a demand for flat tires which provide a higher degree of steering stability. On the other hand, certain limitations imposed by the tire housings which are available in automobiles have made it desirable to develop tires having a ratio of flattening equal to that of the conventional tires, and which are suitable for use at a high speed and provide a high degree of steering stability.

In order to satisfy these requirements, the tire manufacturers have proposed the use of a bead reinforcing layer which comprises a reinforcing sheet of organic fiber cords. In so far as this reinforcing sheet is composed of substantially the same material as the conventional carcass, however, it has been found unsatisfactory for the reinforcing purpose and incapable of satisfying the requirement for tires having a ratio of flattening equal to that of the conventional tires, and which are suitable for use at a high speed and provide a high degree of steering stability.

After their unsuccessful attempts, they have proposed the use of a bead reinforcing sheet of steel cords. Although the reinforcing sheets of steel cords have been found effective for improving tires from the standpoints of durability for use at a high speed and steering stability, a further improvement has been found necessary from the standpoint of riding comfort, as the high rigidity of steel cords lower the riding comfort to an unendurable extent.

SUMMARY OF THE INVENTION

Under these circumstances, it is an object of this invention to provide radial tires which are excellent from the standpoints of steering stability, riding comfort and durability for use at a high speed, and which are suitable for use on automobiles traveling at a high speed.

This object is attained by a radial tire for automobiles having a bead reinforcing layer composed of cords of carbon fiber.

This and other objects of this invention will become apparent from the following description.

DESCRIPTION OF THE PREFERRED EMBODIMENTS

Figure 1:
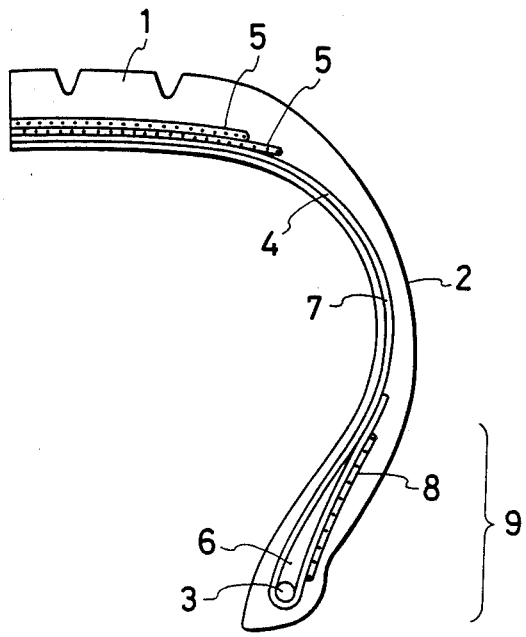
FIGS. 1 to 3 are each a cross sectional view showing a half of a radial tire for automobiles embodying this invention.

The invention will now be described in detail with reference to the drawings. Referring to FIG. 1, a radial tire for automobiles embodying this invention comprises a tread 1, a pair of sidewalls 2 between which the tread 1 extends and a pair of beads 9 joined to the sidewalls 2, respectively, though FIG. 1 shows only one of the sidewalls 2 and one of the beads 9. A carcass 4 extends between the beads 9 and the cords forming it lie at an angle of 70° to 90° to the circumference of the tire. Two belts 5 are laid on the carcass 4 in the tread 1. The cords forming each belt 5 lie at an angle of 10° to 35° to the circumference of the tire. The cords forming one of the belts 5 cross those of the other belt 5. Each bead 9 has a ring of bead wire 3 and a bead filler 6 disposed thereabove. The bead 9 also includes bead reinforcing layer 8 disposed outside the carcass 4 and composed of cords of carbon fiber. An inner liner 7 is provided on the inner surface of the tire.

Figure 2:
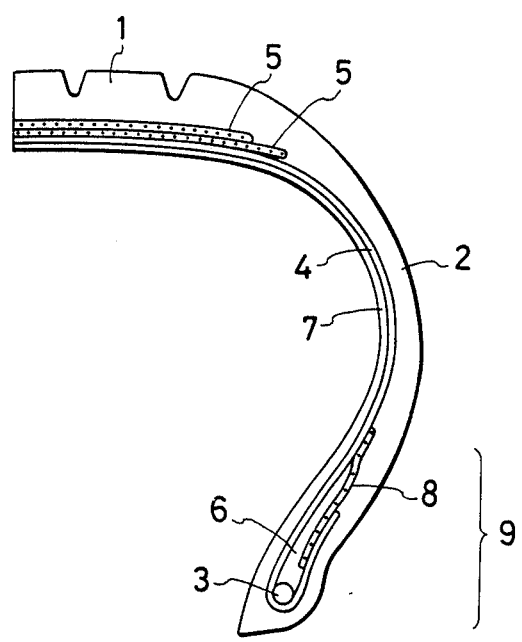
Figure 3:
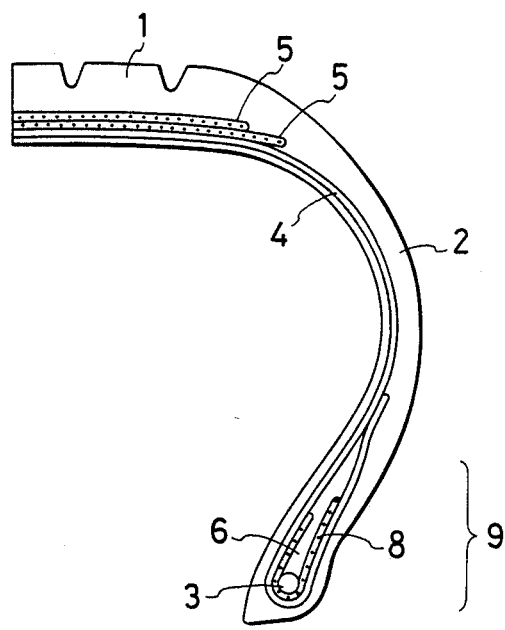

There is no particular limitation to the position of the bead reinforcing layer 8, if it is, of course, provided in the bead 9. Its preferred positions are, however, shown by way of example in FIGS. 1 to 3. FIG. 1 shows the bead reinforcing layer 8 disposed on the outer surface of the outer portion of the carcass 4 folded about the bead wire 3. According to FIG. 2, it is disposed between the bead filler 6 and the outer portion of the carcass 4 folded about the bead wire 3. FIG. 3 shows the bead reinforcing layer 8 disposed within the folded portion of the carcass 4 and extending about the bead wire 3. It is possible to provide one or more bead reinforcing layers 8 for each bead 9 without any limitation in particular.

Each bead reinforcing layer 8 may be composed of any cords of carbon fiber. It is possible to use any cords of carbon fiber without any particular limitation. It is, however, preferable to use cords formed from carbon fiber having a tensile strength of at least 100 kg/mm$^2$ and a modulus in tension of at least 5000 kg/mm$^2$, more preferably a tensile strength of at least 200 kg/mm$^2$ and a modulus in tension of at least 15,000 kg/mm$^2$, by applying 10 to 50% of an adhesive to the fiber based on the weight of the fiber per unit length and twisting it to the extent that the coefficient K of twist expressed by the following formula may be in the range of 0 to 1800, inclusive:

$$K = T\sqrt{D}$$

where
K: coefficient of twist
T: Number of twist (turns/10 cm)
D: Total denier of cord.

The adhesive may be a mixed solution prepared from a precondensate of resorcin and formalin and a rubber latex, which will hereinafter be referred to simply as RFL. The carbon fiber is impregnated with RFL, dried, heat treated and twisted to form cords.

It is preferable to apply 10 to 50% of RFL to the carbon fiber. If the amount of RFL is less than 10%, it is difficult to ensure the satisfactory adhesion of the resulting cords to coating rubber and it is also impossible to improve the flexural fatigue resistance of the carbon fiber. If it exceeds 50%, the resulting adhesive layer is too thick to be dried satisfactorily and forms bubbles, thereby making it difficult to obtain cords of uniform quality. It is more preferable to apply 20 to 40% of RFL to the carbon fiber.

In order to improve the flexural fatigue resistance of carbon fiber, it is important to ensure the full penetration of RFL into the filaments of the fiber. It is, therefore, advisable to apply RFL to the filaments which have been opened.

If RFL is applied to carbon fibers as hereinabove described, it effectively holds them together even if they may not be twisted. It is, however, preferable to twist the fibers to some extent to form a cord in which the fibers are held together more tightly. Carbon fibers, however, reduce their strength and modulus in tension drastically if they are twisted too much. It is, therefore, preferable to twist them to the extent that the coefficient K of twist does not exceed 1800, and is more preferably in the range of 300 to 1500, inclusive.

The cord may be of the plied structure formed by twisting several carbon fibers individually to form several primary twists and twisting those primary twists together. It may alternatively be a single twist obtained by twisting a single strand of carbon fiber.

The cords of carbon fiber prepared as hereinabove described are embedded in coating rubber having a 100% modulus of 30 to 70 kg/cm$^2$ to form the bead reinforcing layer 8. The layer 8 preferably has a cord density of 20 to 60 cords per 5 cm.

The use of coating rubber having a 100% modulus of less than 30 kg/cm$^2$ results in a bead reinforcing layer which is too low in elasticity to provide any satisfactory reinforcing effect and produce a tire which is satisfactory from the standpoint of steering stability. The use of coating rubber having a 100% modulus exceeding 70 kg/cm$^2$ should also be avoided, as it is too hard to be acceptable from the standpoint of productivity and, for example, generates heat and scorches during its application. Thus, it is desirable to use coating rubber having a 100% modulus of 30 to 70 kg/cm$^2$.

The use of more than 60 cords per 5 cm should be avoided, since they fail to define among themselves the spaces which the coating rubber would have to fill to provide a satisfactory bonding strength. The use of less than 20 cords is unsatisfactory for the reinforcing purpose.

The cords in the bead reinforcing layer 8 preferably cross the cords in the carcass 4 at an angle of 20° to 70° thereto so that the former cords may strongly bind the latter and thereby produce a large reinforcing effect to achieve an improvement in the tire from the standpoints of durability for use at a high speed and steering stability. If the angle of crossing is smaller than 20°, there results a reduction in the efficiency of work. The layer is not only difficult to cut, but also likely to form 'wrinkles' during its formation. Any angle exceeding 70° is also undesirable, as it brings about a reduction in the force with which the cords in the layer 8 bind the carcass cords.

The tire of this invention, which is provided along each bead with a bead reinforcing layer formed by cords of carbon fiber as hereinabove described, has the following advantages:

(a) It is superior from the standpoints of durability for use at a high speed and steering stability to the conventional tire having bead reinforcing layers formed by cords of organic fiber, since the bead reinforcing layers in the tire of this invention produce a greater reinforcing effect than those in the conventional tire; and (b) It is superior from the standpoints of durability for use at a high speed and riding comfort to the conventional tire having bead reinforcing layers formed by steel cords, since the bead reinforcing layers in the tire of this invention are by far lower in flexural rigidity.

The advantages of this invention will now be described more specifically with reference to some examples.

EXAMPLES

A tire embodying this invention and comparative tires 1 and 2 were prepared as will hereunder be described.

(1) Tire of this Invention

A tire of the size 165/80 R 13 was made by employing a carcass of 1500 d/2 cords of polyester 90, two belts of 1×5 (0.25) steel cords, the cords in one belt crossing those in the other at an angle of 20° thereto, and a bead reinforcing layer disposed on the outer surface of the outwardly folded portion of the carcass in each bead as shown in FIG. 1. Each bead reinforcing layer was formed by embedding 40 1800 d/2 cords of carbon fibers per 5 cm in rubber having a 100% modulus of 45 kg/cm$^2$, which cords had been prepared by twisting the carbon fibers at a twist number of $10^S \times 10^Z$ turns/10 cm after applying 30% of an adhesive thereto. The layer had a width of 40 mm and a thickness of 1.5 mm. The cords in the bead reinforcing layer were so laid as to cross the carcass cords at an angle of 30° thereto.

(2) Comparative tire 1

Figure 4:
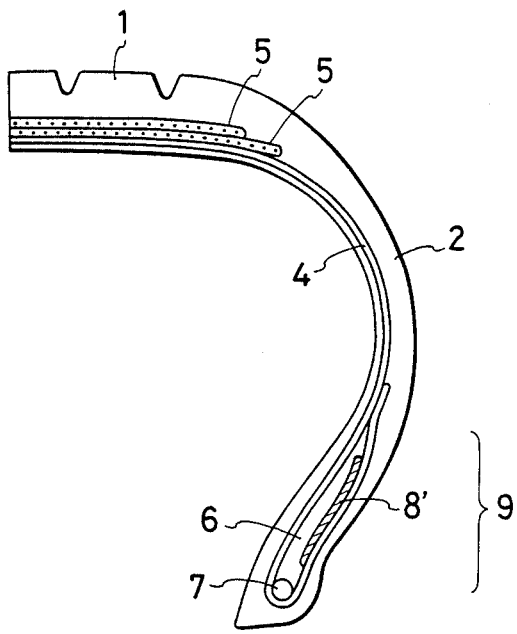
FIGS. 4 and 5 are each a cross sectional view showing a half of a conventional radial tire for automobiles.

A tire of the size 165/80 R 13 was made by disposing a bead reinforcing layer of steel cords within the folded edge portion of the carcass and outwardly of the bead filler 6 in each bead as shown at 8' in FIG. 4. Each bead reinforcing layer was formed by embedding 40 1×5 (0.22) steel cords per 5 cm in rubber having a 100% modulus of 45 kg/cm$^2$. In all the other respects, the tire was identical to the tire of this invention, including the size of the bead reinforcing layers and the angle of their cords to the carcass cords.

(3) Comparative tire 2

Figure 5:
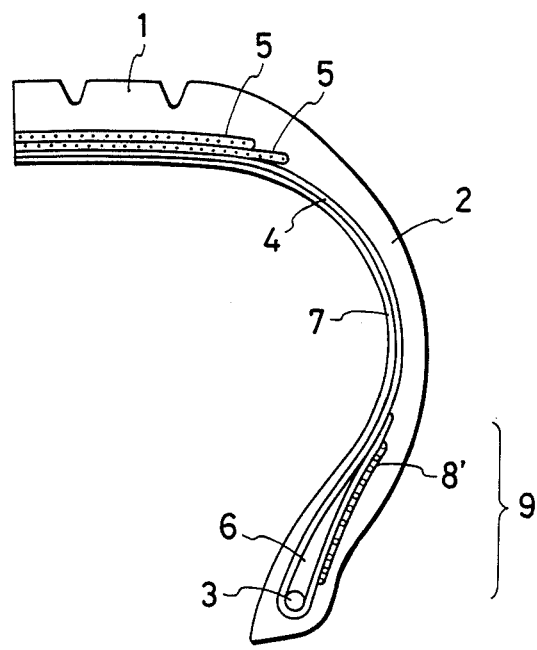

A tire of the size 165/80 R 13 was made by disposing a bead reinforcing layer of nylon cords outwardly of the carcass in each bead as shown at 8' in FIG. 5. Each bead reinforcing layer was formed by embedding 40 840 d/2 nylon cords per 5 cm in rubber having a 100% modulus of 27 kg/cm$^2$ and had a width of 40 mm and a thickness of 1.0 mm. In all the other respects, including the angle of the cords in the bead reinforcing layers to the carcass cords, the tire was identical to the tire of this invention.

The following tests were conducted on the tire of this invention and comparative tires 1 and 2.

Steering Stability Tests

The tests were conducted by an indoor cornering test machine having a drum with a diameter of 2500 mm. Each tire was given a slip angle of 2° on the drum and the resulting cornering force was divided by two to yield an indicator of steering stability. The tests were conducted under the following conditions:

Rim: 4½—J×13
Pneumatic pressure, P: 1.9 kg/cm²
Weight, W: 425 kg
Velocity: 20 km/h.

Figure 6:
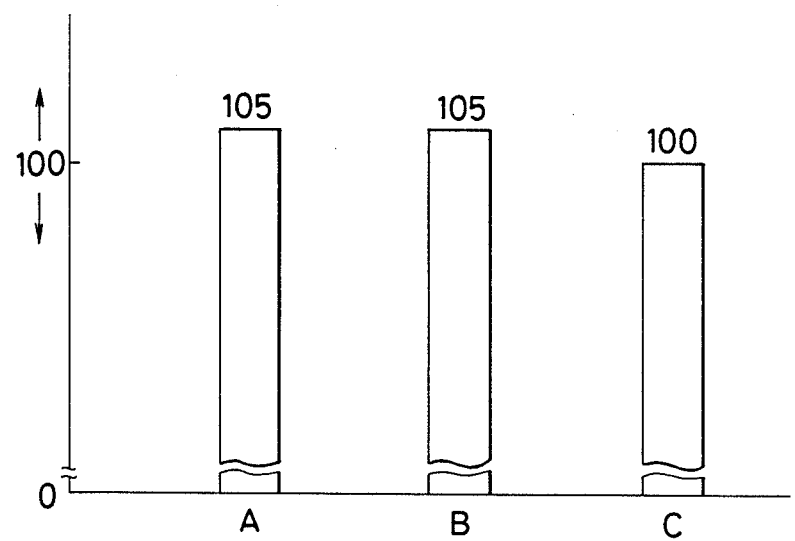
FIG. 6 is a graph comparing three tires from the standpoint of steering stability.

The results are shown by index numbers in FIG. 6, in which the steering stabilities of the tire of this invention (bar A in the graph) and comparative tire 1 (bar B) are compared with the standard number of 100 taken for comparative tire 2 having bead reinforcing layers of nylon cords (bar C) and the larger number indicates the better steering stability. As is obvious from FIG. 6, the tire of this invention was about 5% superior to comparative tire 2, and comparable to comparative tire 1, from the standpoint of steering stability.

Vibratory Riding Comfort Tests

The tests were conducted by an indoor projection testing machine including a drum having a diameter of 2500 mm and provided with a semicircular projection having a diameter of 20 mm on its outer periphery. The tire to be tested was placed on the drum and when it rode over the projection, the resulting axial force was measured to provide an indicator of riding comfort under vibration. The tests were conducted under the following conditions:

Rim: 4½—J×13
Pneumatic pressure, P: 1.9 kg/cm²
Weight, W: 300 kg
Velocity, V: 60, 80, 100 and 120 km/h.

The average of the results obtained at these different speeds was adopted as the test results.

Figure 7:
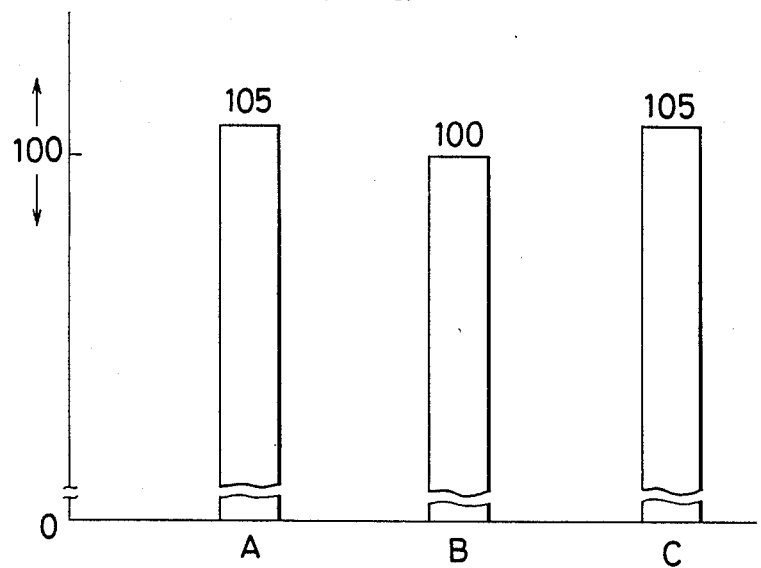
FIG. 7 is a graph comparing those tires from the standpoint of riding comfort.

The results are shown by index numbers in FIG. 7, in which the riding comforts under vibration of the tire of this invention (bar A in the graph) and comparative tire 2 (bar C) are compared with the standard number of 100 taken for comparative tire 1 (bar B) and the larger number indicates the better riding comfort. As is obvious from FIG. 7, the tire of this invention was about 5% superior to comparative tire 1, and comparable to comparative 2, from the standpoint of riding comfort under vibration.

High-Speed Durability Tests

The tests were conducted by an indoor testing machine having a drum with a diameter of 1707 mm under the following conditions:

| Rim | 4½ — J × 13 |
| --- | --- |
| Pneumatic pressure, P | 3.0 kg/cm² |
| Weight, W | 425 kg |
| Velocity | The starting speed was 160 km/h and increased by 10 km/h every ten minutes until the tire being tested broke. |

Figure 8:
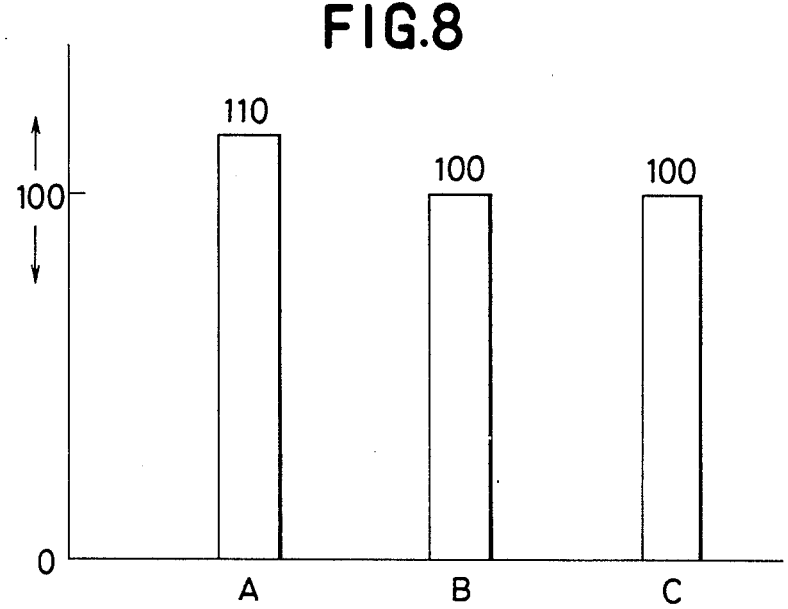
FIG. 8 is a graph comparing those tires from the standpoint of durability for use at a high speed.

The results are shown by index numbers in FIG. 8, in which the high-speed durability of the tire of this invention (bar A) is compared with the standard number of 100 taken for comparative tires 1 and 2 (bars B and C, respectively) and the larger number indicates the higher durability. As is obvious from FIG. 8, the tire of this invention was about 10% superior to comparative tires 1 and 2 from the standpoint of high-speed durability.

We claim:

1. A high-speed radial tire for a passenger automobile, which has a bead portion including a bead filler disposed on a bead wire, a carcass layer folded around said bead wire from the inner side of the tire to the outer side of the tire so as to wrap around said bead filler, and a reinforcing layer disposed between the outer side of the folded-around carcass layer and the outer side of the tire, the reinforcing layer comprising carbon fiber cords in a coating rubber having a 100% modulus within the range of 30 to 70 kg/cm² and having a number of 20 to 60 cords per 5 cm of the coating rubber, said carbon fiber cords in the reinforcing layer being crossed with cords in a carcass layer of the tire at an angle within the range of 20° to 70°.

2. A radial tire as set forth in claim 1, wherein said carbon fibers have a tensile strength of at least 100 kg/mm² and a modulus in tension of at least 5000 kg/mm² and said cords of carbon fibers are obtained by applying 10 to 50% of an adhesive to said carbon fibers based on the weight thereof per unit length and twisting said fibers to the extent that the coefficient of twist K expressed by the following formula may be in the range of 0 to 1800, inclusive:

$$K = T\sqrt{D}$$

where
K: coefficient of twist,
T: Number of twist (turns/10 cm), and
D: Total denier of cord.

3. A radial tire as set forth in claim 2, wherein said adhesive is a mixed solution prepared from a recondensate of resorcin and formalin and a rubber latex.

4. A radial tire as set forth in claim 2, wherein said coefficient of twist K is in the range of 300 to 1500, inclusive.

* * * * *